United States Patent
Ajimoto

(10) Patent No.: US 9,671,017 B2
(45) Date of Patent: Jun. 6, 2017

(54) SHIFT CONTROL DEVICE FOR CONTINUOUSLY VARIABLE TRANSMISSION

(71) Applicant: Fuji Jukogyo Kabushiki Kaisha, Tokyo (JP)

(72) Inventor: Keisuke Ajimoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 235 days.

(21) Appl. No.: 14/549,974

(22) Filed: Nov. 21, 2014

(65) Prior Publication Data

US 2015/0152962 A1   Jun. 4, 2015

(30) Foreign Application Priority Data

Dec. 3, 2013   (JP) ................. 2013-249830

(51) Int. Cl.
*F16H 61/662* (2006.01)
*F16H 61/664* (2006.01)
*F16H 59/20* (2006.01)
*F16H 59/24* (2006.01)

(52) U.S. Cl.
CPC ... *F16H 61/6648* (2013.01); *F16H 61/66259* (2013.01); *F16H 59/20* (2013.01); *F16H 59/24* (2013.01); *Y10T 477/619* (2015.01)

(58) Field of Classification Search
None
See application file for complete search history.

(56) References Cited

U.S. PATENT DOCUMENTS

| 4,115,671 | A | | 9/1978 | Iijima | |
|---|---|---|---|---|---|
| 4,622,865 | A | * | 11/1986 | Itoh | F16H 61/66 477/120 |
| 5,382,205 | A | * | 1/1995 | Togai | B60W 10/06 477/43 |
| 6,379,282 | B1 | * | 4/2002 | Aoki | B60K 6/365 477/109 |

(Continued)

FOREIGN PATENT DOCUMENTS

| JP | S52-081469 A | 7/1977 |
|---|---|---|
| JP | S60-128049 U1 | 8/1985 |

(Continued)

OTHER PUBLICATIONS

Japanese Office Action dated May 31, 2016 with an English translation thereof.
Japanese First Notification for Reason for Refusal dated Oct. 27, 2015 with an English translation thereof.

(Continued)

*Primary Examiner* — Justin Holmes
(74) *Attorney, Agent, or Firm* — McGinn IP Law Group, PLLC

(57) ABSTRACT

A transmission control device includes a converter that converts continuous accelerator positions detected by an accelerator pedal sensor into a stepped step position, and a controller that controls the gear ratio of a continuously variable transmission based on the converted step position. The converter creates a hysteresis regarding the converted step position, when the accelerator depression amount increases, and when the accelerator depression amount decreases. In the case where the step position reaches a predetermined position or greater, the controller executes kick-down control where the gear ratio is controlled to a low side.

19 Claims, 6 Drawing Sheets

(56) References Cited

U.S. PATENT DOCUMENTS

| | | | | |
|---|---|---|---|---|
| 2003/0104903 A1* | 6/2003 | Kurabayashi | ........... | F16H 59/20 |
| | | | | 477/48 |
| 2003/0135315 A1* | 7/2003 | Watanabe | ........... | F16H 61/6648 |
| | | | | 701/51 |
| 2008/0234904 A1* | 9/2008 | Tawara | ............. | F16H 61/66259 |
| | | | | 701/56 |
| 2011/0238272 A1* | 9/2011 | Kato | ..................... | B60W 10/06 |
| | | | | 701/55 |
| 2012/0053768 A1* | 3/2012 | Jeon | ......................... | B60K 6/48 |
| | | | | 701/22 |
| 2012/0143441 A1* | 6/2012 | Yamazaki | ............ | B60K 26/021 |
| | | | | 701/36 |

FOREIGN PATENT DOCUMENTS

| | | |
|---|---|---|
| JP | S63-265742 A | 11/1988 |
| JP | UM H04-054365 Y2 | 12/1992 |
| JP | 2001-099286 A | 4/2001 |
| JP | 2003-172446 A | 6/2003 |
| JP | 2004-125072 A | 4/2004 |
| JP | 2005-195092 A | 7/2005 |
| JP | 2013-167349 A | 8/2013 |
| JP | 2013-200003 A | 10/2013 |

OTHER PUBLICATIONS

Japanese Second Notification for Reason for Refusal dated May 31, 2016 with an English translation thereof.
Japanese Decision to Grant a Patent dated Oct. 4, 2016 with an English translation thereof.

\* cited by examiner

SHIFT CONTROL DEVICE FOR CONTINUOUSLY VARIABLE TRANSMISSION

CROSS-REFERENCE TO RELATED APPLICATIONS

The present application claims priority from Japanese Patent Application No. 2013-249830 filed on Dec. 3, 2013, the entire contents of which are hereby incorporated by reference.

BACKGROUND

1. Technical Field

The present invention relates to a shift control device for a continuously variable transmission.

2. Related Art

Continuously variable transmissions (CVTs), such as belt type CVTs and toroidal CVTs, have come into widespread used in recent years as automotive automatic transmissions (e.g., see Japanese Unexamined Patent Application Publication No. 2004-125072). Continuously variable transmissions enable non-step gear ratio change, without speed shift shock, and can improve gas mileage. A belt type continuously variable transmission includes a primary pulley provided to an input shaft, a secondary pulley provided to an output shaft, and a drive transmission component such as a belt or chain, running over the pulleys. The gear ratio is steplessly changed by changing the groove width of the pulleys, thereby changing the diameter of the position where the drive transmission component rides.

In such continuously variable transmissions, the gear ratio is controlled based on throttle position (accelerator position) and vehicle speed, engine speed, or some other parameter indicating the running state of the vehicle. Target primary pulley rotation number is set based on these parameters, and the gear ratio is set such that the actual primary pulley rotation number changes to be the same as the target primary pulley rotation number.

However, continuously variable transmissions have a problem that in transience during gear shifting, when the accelerator pedal is depressed and the rotations change, the engine torque is absorbed by the inertia of the pulleys (engine torque is consumed in raising the rotations of the pulleys), and so the amount of torque consumed is torque lost. This means that when the driver steps on the accelerator pedal, the torque is not immediately available, and so the vehicle accelerates with a delayed response. In such situations, the driver may feel that the intended acceleration is not being attained and further step on the accelerator, resulting in excessive acceleration, so the driver then has to back off of the accelerator. Conventional continuously variable transmissions have had this problem that there is a difference between the acceleration which the driver intends and the acceleration actually obtained, which may result in the driver having an uncomfortable sensation.

Also, there has been a problem that kick-down control start determination (transition condition) has conventionally been performed based on the accelerator position and accelerator opening rate, so kick-down control might not be initiated if the driver slowly depresses the accelerator pedal. That is to say, kick-down might not be initiated if the accelerator pedal is depressed slowly, even if the accelerator position and the depression amount are the same.

SUMMARY OF THE INVENTION

The present invention has been made in light of the above-described problem, and accordingly it is an object thereof to provide a shift control device for a continuously variable transmission which can reduce uncomfortable sensations of the driver when the continuously variable transmission changes gear ratios.

An aspect of the present invention provides a shift control device for a continuously variable transmission including a detector that detects an accelerator operation amount, a converter that converts a continuous operation amount detected by the detector into a stepped operation amount, and a controller that controls a gear ratio of the shift control device based on the stepped operation amount converted by the converter.

The controller may create a hysteresis regarding the stepped operation amount which is converted, when an accelerator operation amount increases, and when the accelerator operation amount decreases.

In the case where the stepped operation amount reaches a predetermined amount or greater, the controller may execute kick-down control where the gear ratio is controlled to a low side.

In the case where, during executing of the kick-down control, the number of steps of the stepped operation amount has increased by an amount equal to or greater than a first number of steps as compared to the point when the kick-down control was started, the controller may start the kick-down control again.

In the case where, during executing of the kick-down control, the number of steps of the stepped operation amount has decreased by an amount equal to or greater than a second number of steps as compared to the point when the kick-down control was started, the controller may control the gear ratio to a high side.

In the case where, during executing of the kick-down control, the number of steps of the stepped operation amount has decreased by an amount equal to or greater than a third number of steps as compared to the point when the kick-down control was started, the controller may disengage the kick-down control.

During executing of the kick-down control, the controller may execute upshift control when predetermined engine speed are reached, and change a gearshift speed in accordance with the number of times of having executed upshift control.

DETAILED DESCRIPTION

Figure 1:
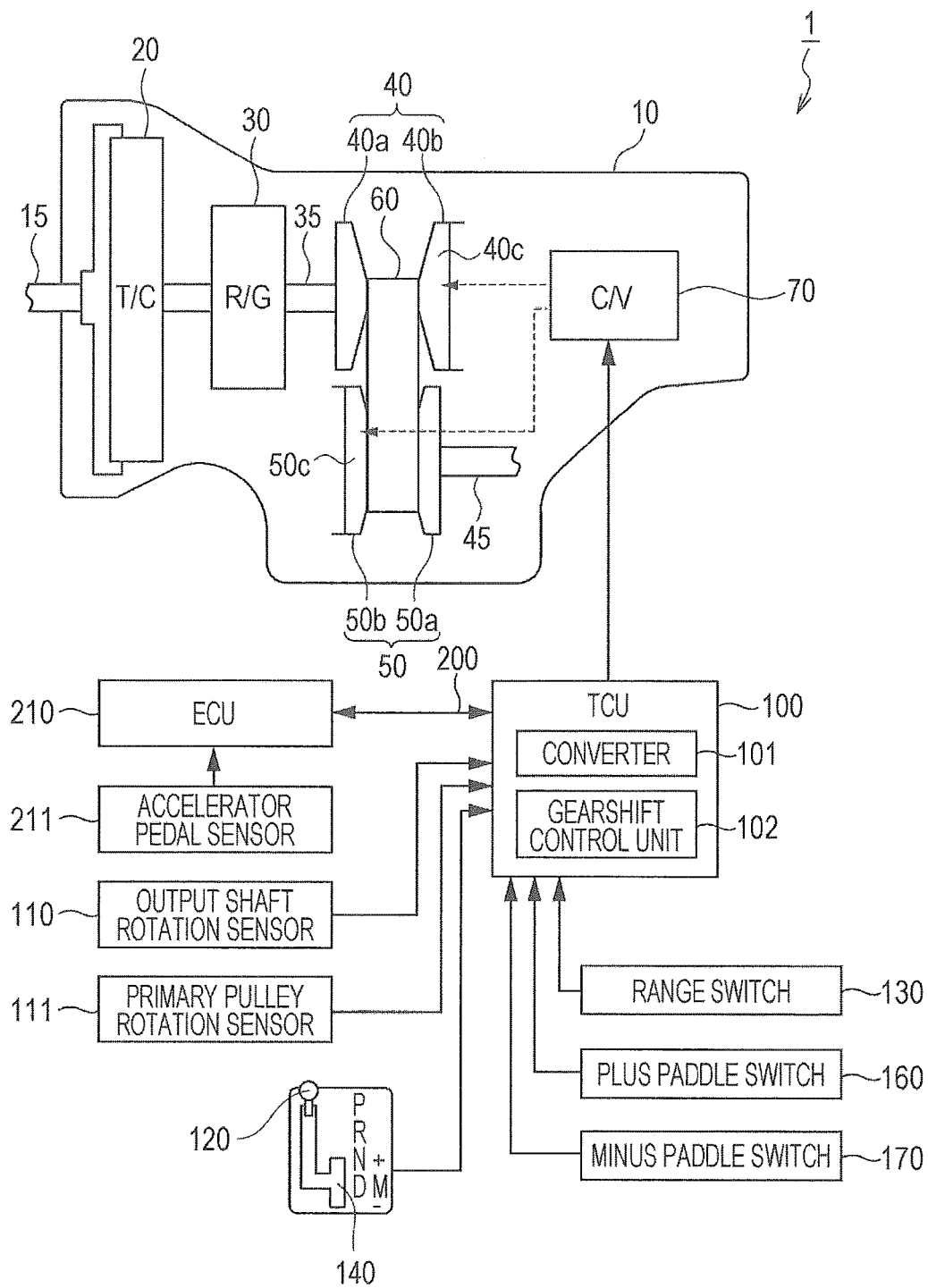
FIG. 1 is a block diagram illustrating the configuration of a shift control device for a continuously variable transmission according to an implementation, and a continuously variable transmission to which the shift control device has been applied.

An implementation of the present invention will be described in detail with reference to the drawings. Components which are the same in multiple drawings are denoted with the same reference numerals, and redundant description thereof will be omitted.

First, the configuration of a shift control device 1 of a continuously variable transmission according to the implementation will be described with reference to FIG. 1. FIG. 1 is a block diagram illustrating the configuration of the shift control device 1 for a continuously variable transmission according to the present invention, and a continuously variable transmission 10 to which the shift control device 1 has been applied.

The continuously variable transmission 10 is a continuously variable transmission which automatically and steplessly changes the gear ratio, in accordance with the running state of the vehicle. The continuously variable transmission 10 is connected to an output shaft 15 of an engine, so as to convert and output the driving force from the engine.

The continuously variable transmission 10 includes a primary shaft 35 which is connected to the output shaft 15 of the engine via a torque converter 20 which as clutching functions and torque amplifying functions, and a reduction gear 30. The continuously variable transmission 10 also includes a secondary shaft 45 disposed in parallel to the primary shaft 35.

A primary pulley 40 is provided on the primary shaft 35. The primary pulley 40 includes a fixed sheave 40a which is affixed to the primary shaft 35, and a movable sheave 40b which is slidably movable in the axial direction of the primary shaft 35 in relation to the fixed sheave 40a, so that the spacing between the conical faces of the sheaves 40a and 40b, i.e., the pulley groove width, can be changed. On the other hand, a secondary pulley 50 includes a fixed sheave 50a which is affixed to the secondary shaft 45, and a movable sheave 50b which is slidably movable in the axial direction of the secondary shaft 45 in relation to the fixed sheave 50a, so that the pulley groove width can be changed.

A chain 60 runs between the primary pulley 40 and the secondary pulley 50 to transmit driving force. The gear ratio is steplessly changed by changing the groove widths of the primary pulley 40 and secondary pulley 50 by changing the ratio of the belt loop radius of the chain 60 riding on the pulleys 40 and 50 (pulley ratio). The gear ratio i can be expressed by $$i = Rs/Rp$$

where Rp represents the pitch radius of the chain 60 as to the primary pulley 40, and Rs as to the secondary pulley 50.

Now, a hydraulic chamber 40c is formed in the primary pulley 40 (movable sheave 40b), and a hydraulic chamber 50c is formed in the secondary pulley 50 (movable sheave 50b). the groove widths of the primary pulley 40 and secondary pulley 50 are set and changed by adjusting primary oil pressure introduced to the hydraulic chamber 40c of the primary pulley 40 and secondary oil pressure introduced to the hydraulic chamber 50c of the secondary pulley 50.

The oil pressure for causing the continuously variable transmission 10 to change speeds, i.e., the aforementioned primary oil pressure and secondary oil pressure is controlled by a valve body (control valve) 70. The valve body 70 adjusts oil pressure of oil discharged from an oil pump by opening and closing an oil passage formed within the valve body 70, using a spool valve and a solenoid valve (electromagnetic valve) to move the spool valve. The valve body 70 thus provides the hydraulic chamber 40c of the primary pulley 40 and the hydraulic chamber 50c of the secondary pulley 50 with oil pressure. The valve body 70 also supplies oil pressure to a forward/reverse switching mechanism which switches the forward/reverse directions of the vehicle, and so forth.

The shift control of the continuously variable transmission 10 is performed by a transmission control device (hereinafter referred to as a "TCU") 100. The TCU 100 controls the driving of the solenoid valve (electromagnetic valve) of the valve body 70, thereby adjusting the oil pressure supplied to the hydraulic chamber 40c of the primary pulley 40 and the hydraulic chamber 50c of the secondary pulley 50 so as to change the gear ratio of the continuously variable transmission 10.

The TCU 100 is connected to an engine control device (hereinafter referred to as "ECU") 210 which centrally controls the engine, via a vehicle communication line 200 such as a controller area network (CAN) or the like, for example. Connected to the ECU 210 is an accelerator pedal sensor 211 which detects how far the accelerator pedal has been pressed down, i.e., the accelerator position. The accelerator pedal sensor 211 serves as the detector the present invention. The ECU 210 also has connected thereto various sensors, such as a crank angle sensor to detect the rotational position of a crankshaft, an airflow meter to detect air intake amount, a coolant temperature sensor to detect the temperature of coolant for the engine, an oil temperature sensor which detects the temperature of engine oil, an air-fuel ratio sensor, and so forth.

The ECU 210 distinguishes cylinders from the output of a cam angle sensor, and calculates the engine speed from the output of the crank angle sensor. The ECU 210 further obtains various types of information from detection signals from the aforementioned sensors, such as air intake amount, accelerator position, air-fuel ratio of the air-fuel mixture, engine coolant temperature, oil temperature, and so forth. The ECU 210 moreover centrally controls the engine, such as the amount of fuel injection and spark timing, by controlling various devices such as an electronic throttle control valve or the like, based on the various information. The TCU 100 receives the engine speed, accelerator position, and so forth, that are transmitted from the ECU 210, via the vehicle communication line 200 such as the aforementioned CAN or the like.

The TCU 100 is also provided with an output shaft rotation sensor (vehicle speed sensor) 110 which is attached near the output shaft (secondary shaft 45) of the continuously variable transmission 10 and detects the rotations of the output shaft, a primary pulley rotation sensor 111 which detects the rotations of the primary pulley 40, and so forth.

A shift lever (select lever) 120 which accepts driver operations to switch to one or the other of an automatic shift mode ("D" range) and manual shift mode ("M" range) is provided on the floor or the like of the vehicle. The shift lever 120 has attached thereto a range switch 130 which is connected so as to operate in conjunction with the shift lever 120, to detect the selected position of the shift lever 120. The range switch 130 is connected to the TCU 100, and the selected position of the shift lever 120 that has been detected is read by the TCU 100. The shift lever 120 is used to selectively switch between, in addition to the "D" range and "M" range, a parking "P" range, reverse "R" range, and neutral "N" range.

The shift lever 120 includes an M range switch 140 which is turned on when the shift lever 120 is at the "M" range side position, i.e., when the manual shift mode where the gear ratio is switched by driver gear shift operations has been selected, and is turned off when the shift lever 120 is at the "D" range side, i.e., when the automatic shift mode where the gear ratio is automatically changed according to the running state of the vehicle. The M range switch 140 is also connected to the TCU 100.

On the other hand, behind a steering wheel, which is omitted from illustration, are provided a plus (+) paddle switch 160 and a minus (−) paddle switch 170 which accept driver gear shift operations (gear shift requests) when the manual gear shift mode has been selected. Thereinafter, the plus paddle switch 160 and minus paddle switch 170 may be collectively referred to as "paddle switches 160 and 170". The plus paddle switch 160 is used to manually sift up, and the minus paddle switch 170 is used to manually shift down. The plus paddle switch 160 and the minus paddle switch 170 are connected to the TCU 100, and switch signals of the paddle switches 160 and 170, output from the paddle switches 160 and 170, are read by the TCU 100.

The TCU 100 is configured including a microprocessor which performs computations, read only memory (ROM) which stores programs, a gear shift map, and so forth, so as to cause the microprocessor to execute the various processes, random-access memory (RAM) which stores various types of data, such as computation results and so forth, a backup RAM which holds the stored contents by way of a 12 V battery, an input/output interface, and so forth.

Figure 3:
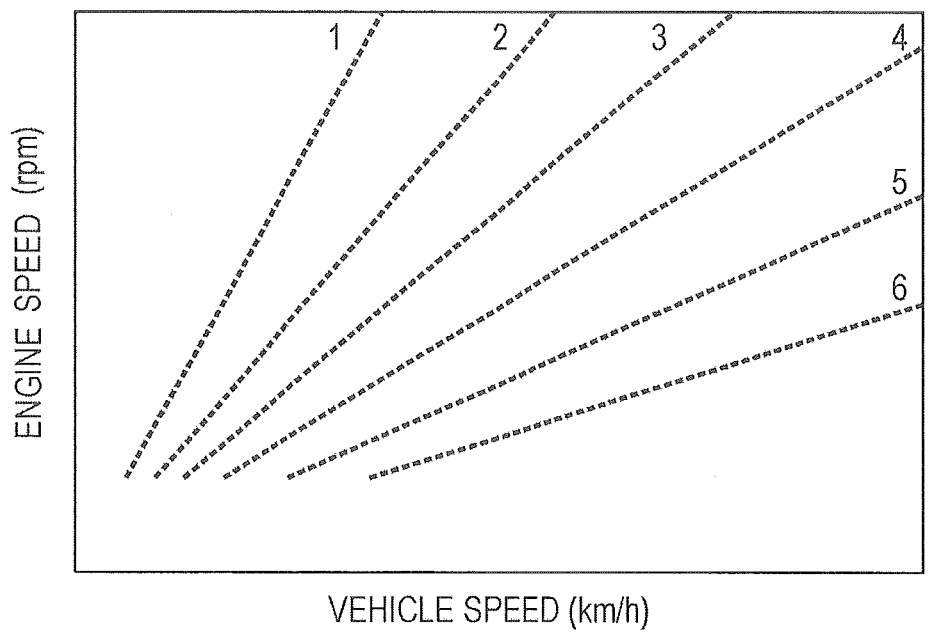
FIG. 3 is a diagram for describing gear ratio settings of the continuously variable transmission according to the implementation.

In the case where the automatic shift mode is selected, the TCU 100 follows the gear shift map to perform automatic stepless shifting of the gear ratio, in accordance with the running state of the vehicle (e.g., later-described step position, vehicle speed, engine speed, or the like). This gear shift map corresponding to the automatic shift mode is stored in the ROM within the TCU 100. FIG. 3 is a gear shift property line diagram, illustrating the relation between engine speed and gearshift. The horizontal axis in FIG. 3 is vehicle speed (km/h), and the vertical axis is engine speed (rpm). The six dashed lines each illustrate the relation between the engine speed and the vehicle speed in the case where the gear ratio is unchanged (i.e., gear ratio properties when in manual shift mode). In automatic shift mode, a suitable gear ratio from first speed (low) to sixth speed (overdrive) illustrated in FIG. 3 is automatically selected in accordance to the vehicle running state. On the other hand, when the manual shift mode has been selected, the TCU 100 controls the gear ratio based on the shift operations accepted by the paddle switches 160 and 170.

The TOO 100 controls the gear ratio so as to reduce uncomfortable sensation of the driver when the continuously variable transmission 10 is shifting (when accelerating/decelerating, particularly during kick-down) in the automatic shift mode. To this end, the TCU 100 functionally includes a converter 101 and a shift control unit 102. The functions of the converter 101 and the shift control unit 102 are realized at the TCU 100 by a program stored in the ROM being executed by the microprocessor.

Figure 2:
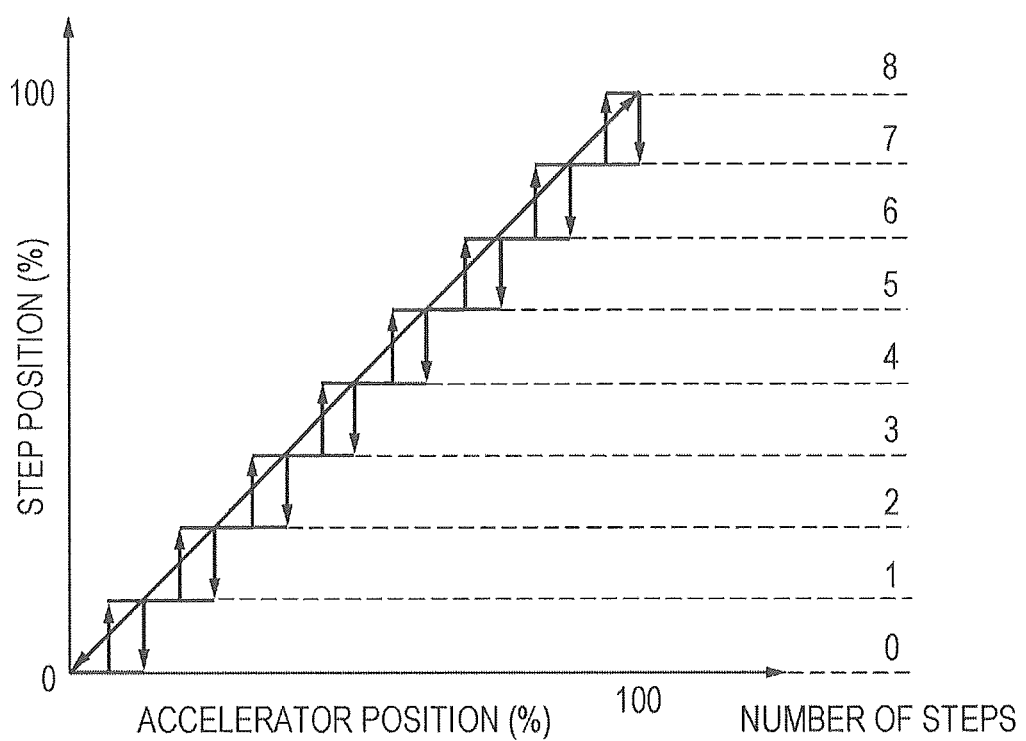
FIG. 2 is a diagram for describing a conversion method between step position and number of steps.

The converter 101 converts the continuously-changing actual accelerator position (operation amount) which has been detected by the accelerator pedal sensor 211 and received via the vehicle communication line 200 such as a CAN or the like, and converts this into stepped accelerator position (hereinafter "step position), as illustrated in FIG. 2. That is to say, the converter 101 the converter of the present invention. Now, the step position is represented by unique numbers (number of steps) regarding the change in steps. That is to say, the converter 101 sets the number of steps in accordance with the stage of step position. In the example in FIG. 2, the number of steps is 0 when the accelerator position is 0%, and number of steps is 8 when the accelerator position is 100%.

The converter 101 creates a hysteresis regarding the converted step positions at the time of obtaining the step position, when the accelerator pedal depression amount (accelerator position) increases and decreases, as illustrated in FIG. 2. The step position and number of steps converted by the converter 101 are output to the shift control unit 102.

The shift control unit 102 controls the gear ratio of the continuously variable transmission 10 by setting target engine speed (target primary pulley rotations) based on the step position and number of steps converted by the converter 101, and the vehicle speed. That is to say, the shift control unit 102 serves as the controller the present invention.

Figure 5:
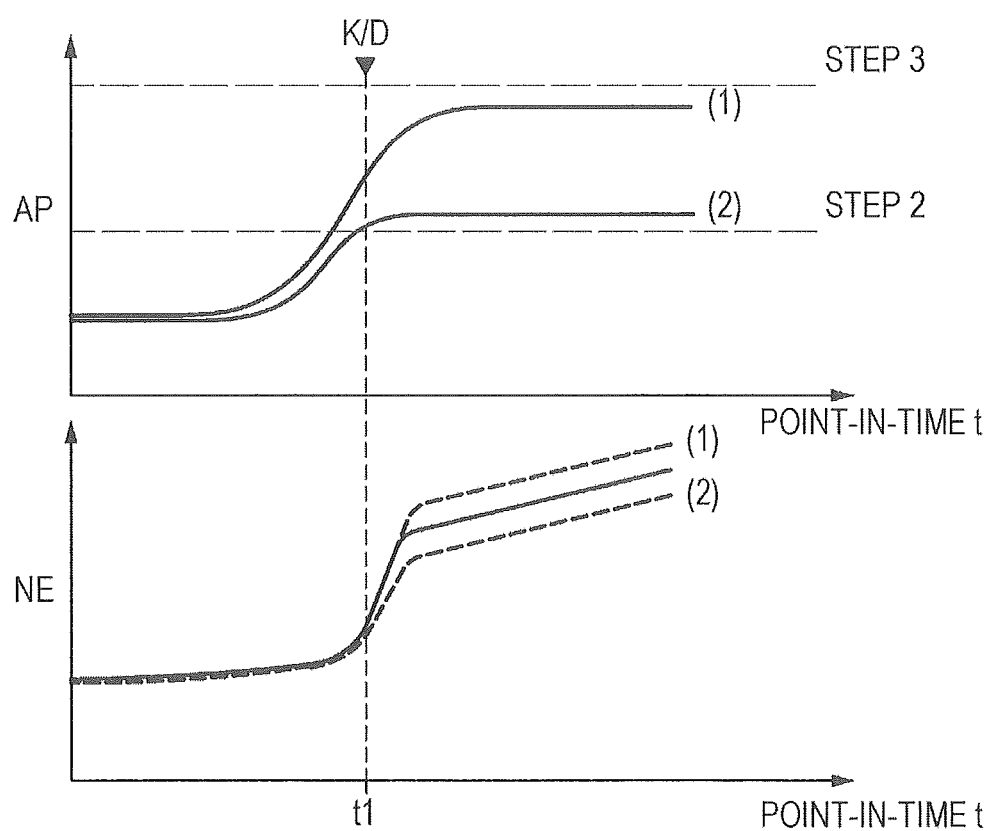
FIG. 5 is a diagram for describing the relation between accelerator position and engine speed.

The relation between the accelerator position and the target engine speed (target primary pulley rotations) is illustrated in FIG. 5, which is a diagram to describe the relation between accelerator position (AP) and target engine speed (NE). In conventional control, the target engine speed change (dashed lines (1) and (2) in lower tier in FIG. 5) as the accelerator pedal position changes ((1) and (2) in upper tier in FIG. 5). Conversely, in the control according to the implementation, if the converted step position is the same (the same number of steps, step 2 in the example in FIG. 5), the same target engine speed is set even if the actual accelerator position is different (solid line at lower tier in FIG. 5). Accordingly, even if the accelerator pedal depression amount (actual accelerator position) changes within the range of the same step position, the engine speed remains unchanged.

Also, in the event that the step position is a predetermined step position (kick-down determination position) or higher, the shift control unit 102 executes kick-down control where the gear ratio is controlled to the low side and the engine speed is rapidly increased.

In the event that the predetermined engine speed is achieved while executing the kick-down control, the shift control unit 102 executes upshift control. More specifically, when performing kick-down control, the shift control unit 102 executes downshift control (control where the gear ratio moves to the low side) to increase the engine speed (primary pulley rotations), and upon the engine speed reaching the predetermined value, the shift control unit 102 then performs upshift control (control where the gear ratio moves one stage to the high side, for example) to decrease the engine speed. Thereafter, (after upshifting), the engine speed is increased again and upon reaching the predetermined value, the shift control unit 102 executes upshift control again. The shift control unit 102 repeatedly performs such control during kick-down control. At this time, the shift control unit 102 changes the gearshift speed depending upon the number of times of executing upshift control (e.g., the greater the number of times executed, the lower the gearshift speed is), as can be seen from the later-described FIG. 6. Adjustment of the gearshift speed is performed by adjusting the amount of increase/amount of decrease of oil pressure per time unit supplied to the hydraulic chamber 40c of the primary pulley 40 and the hydraulic chamber 50c of the secondary pulley 50.

While executing kick-down control (after having started execution), if the number of steps increases a first number of steps (e.g., 3 steps) or more from the time of starting kick-down control, the shift control unit 102 starts kick-down control again. That is to say, the shift control unit 102 controls the gear ratio to the low side again, to rapidly increase the engine speed. The control thereafter is the same as that described above, so detailed description will be omitted here.

On the other hand, while executing kick-down control, if the number of steps decreases a second number of steps or more from the time of starting kick-down control, the control unit 102 performs upshift control (control where the gear ratio moves one stage to the high side, for example), as can be seen from the later-described FIG. 6.

While executing kick-down control, if the number of steps decreases a third number of steps or more from the time of starting kick-down control, the control unit 102 disengages kick-down control. This third number of steps is set to be a larger value than the aforementioned second number of steps.

Figure 6:
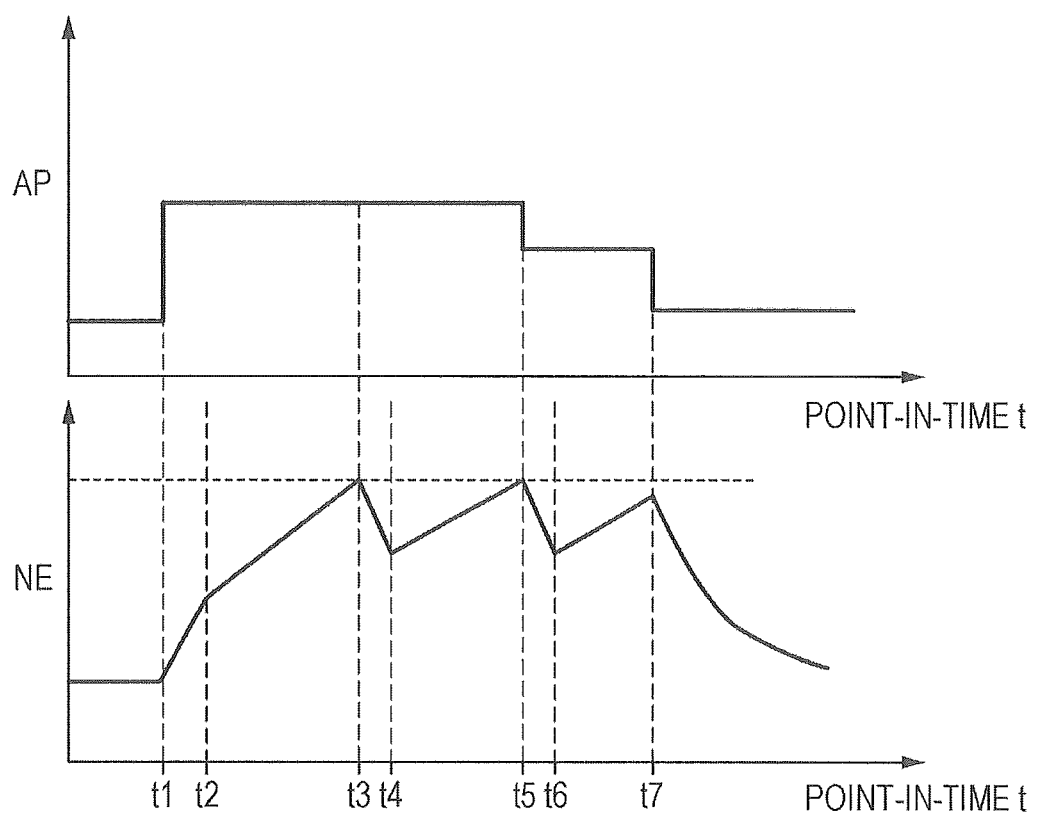
FIG. 6 is a timing chart illustrating an example of change in accelerator position and engine speed.

FIG. 6 is a timing chart illustrating an example of change to accelerator position (AP) and engine speed (NE) (primary pulley rotations) in one kick-down control. Upon the accelerator position having been depressed at point-in-time t1, kick-down control is initiated, the gear ratio is shifted to the low side, and engine speed rapidly increases. Thereafter (after the engine speed increases to the predetermined speed), control is performed in the section from point-in-time t2 to t3 to increase the engine speed, to match the increase in vehicle speed. Thereafter, if the accelerator pedal remains depressed to a certain position, upshift control is performed when the engine speed reaches the predetermined speed (point-in-time t3), so the engine speed temporarily decreases (point-in-time t3 to t4).

After the engine speed decreases to the predetermined speed (after upshift has ended), control is performed to increase the engine speed again, to match the increase in vehicle speed (point-in-time t4 through t5). The increase in engine speed in this section is not as steep as between point-in-time t2 and t3. Thereafter, upon the accelerator pedal being returned hallway (point-in-time t5), upshift control is performed in the same way as with a conventional (stepped) automatic transmission (AT), and the engine speed decreases (point-in-time t5 to t6). If the accelerator pedal remains depressed to a certain position thereafter, control is performed to increase the engine speed again, to match the increase in vehicle speed (point-in-time t6 through t7). Upon the accelerator pedal being released after this (point-in-time t7 and thereafter), the kick-down control is disengaged, and the shift control unit 102 returns to normal gearshift control.

Figure 4:
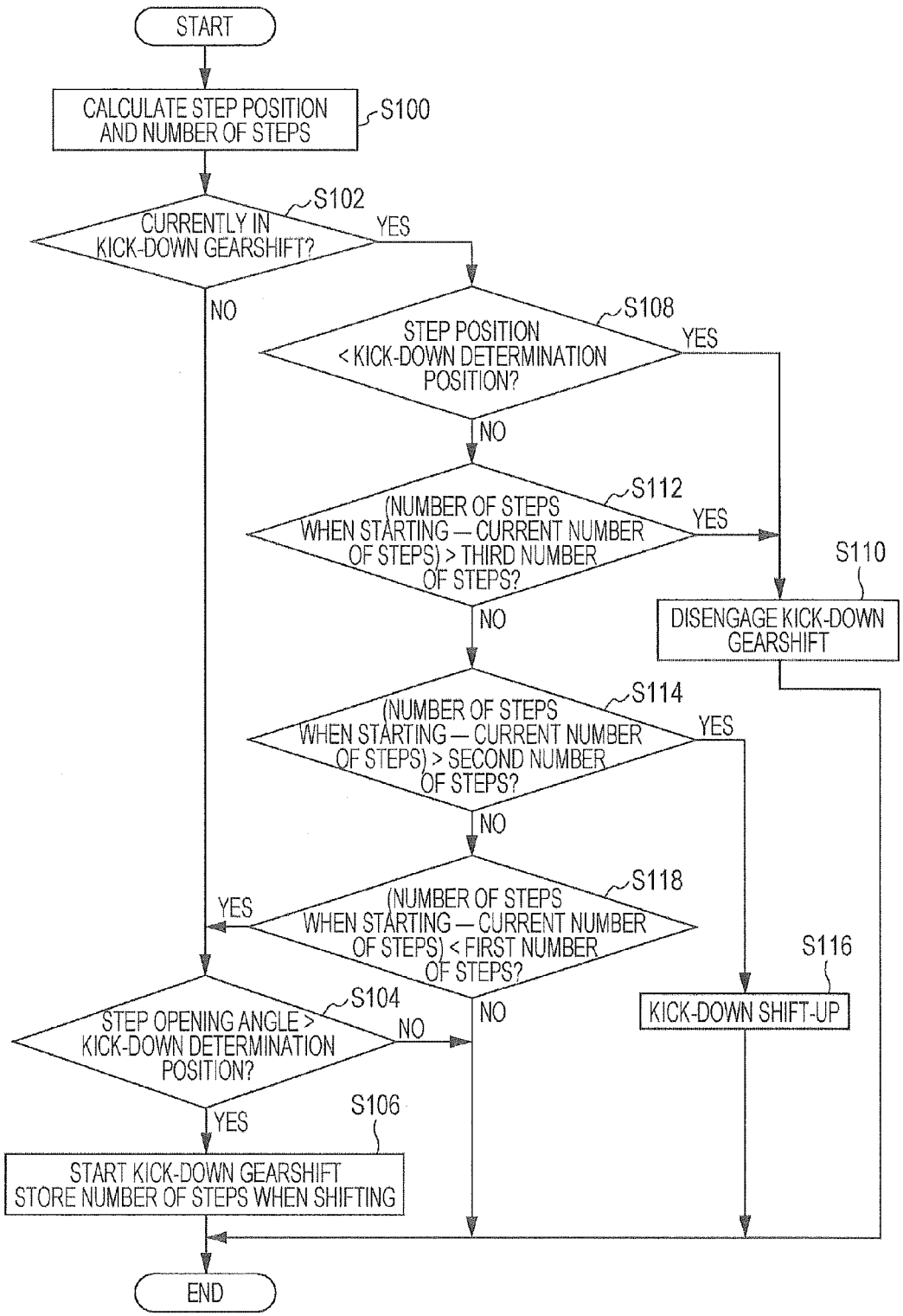
FIG. 4 is a flowchart illustrating kick-down processing procedures by the shift control device of the continuously variable transmission according to an implementation.

Next, the operations of the shift control device 1 of the continuously variable transmission 10 will be described with reference to FIG. 4. FIG. 4 is a flowchart illustrating kick-down processing procedures by the shift control device 1 of the continuously variable transmission 10. This processing is repeated every certain time interval (e.g., every 10 ms) at the TCU 100.

First, in step S100 the read continuous accelerator position is converted, and the step position and number of steps are calculated. Next, in step S102, determination is made regarding whether or not kick-down (K/D) gearshift is currently being performed, i.e., whether or not kick-down control is being executed. In the case where kick-down gearshift is currently being performed, the flow advances to step S108. On the other hand, a case where kick-down gearshift is not currently being performed, the flow advances to step S104.

In step S104, determination is made regarding whether or not the step position is greater than the kick-down determination position. In the case where the step position is greater than the kick-down determination position, the flow advances to step S106. On the other hand, in the case where the step position is not greater than the kick-down determination position, the flow ends.

In step S106, kick-down gearshift control is started, and the number of steps at the time of starting kick-down gearshift control is stored in the RAM or the like. Thereafter, the flow ends.

In the case where determination is made in step S102 that kick-down gearshift is being performed, in step S108 determination is made regarding whether or not the step position is smaller than a kick-down disengaging position (e.g., full-open). In the case where the step position is smaller than the kick-down disengaging position, kick-down gearshift is disengaged in step S110, and the flow ends. On the other hand, in the case where the step position is not smaller than the kick-down disengaging position, the flow advances to step S112.

In step S112, determination is made whether or not a value obtained by subtracting the current number of steps from the number of steps at the time that kick-down was started is greater than the third number of steps. In the case where the above subtracted value is greater than the third number of steps (i.e., in the case where the depression amount of the accelerator pedal has greatly decreased after kick-down), kick-down gearshift is disengaged in step S110, following which the flow ends. On the other hand, in the case where the subtracted value is not greater than the third number of steps, the flow advances to step S114.

In step S114, determination is made regarding whether a value obtained by subtracting the current number of steps from the number of steps at the time that kick-down was started is greater than the second number of steps, where second number of steps<third number of steps holds. In the case where the above subtracted value is greater than the second number of steps (i.e., in the case where the depression amount of the accelerator pedal has decreased after kick-down), upshift gearshift (control to change the gear ratio one to the high side, for example) is executed in step S116, and thereafter the flow ends. On the other hand, in the case where the above subtracted value is not greater than the second number of steps, the flow advances to step S118.

In step S118, determination is made regarding whether a value obtained by subtracting the current number of steps from the number of steps at the time that kick-down was started is smaller than the first number of steps. In the case where the above subtracted number is a smaller value than the first number of steps (i.e., in the case where the accelerator has been further depressed after kick-down), the flow advances to step S104, and kick-down gearshift is executed again. Processing of step S104 and thereafter has already been described, so description will be omitted here. On the other hand, in the case where the subtracted value is not smaller than the first number of steps, the flow ends.

As described above in detail, according to the implementation, a continuously-changing actual accelerator position is converted into a step position which changes in a stepped manner, and the gear ratio is controlled based on the step position. Thus, the gear ratio (engine rotations) does not change within the same step operation amount, so the engine torque is not absorbed by increase/decrease in inertia at the pulleys 40 and 50, and is quickly output to the drive system. Accordingly, the vehicle responds well to increased accelerator operation amount so as to accelerate/decelerate in response to engine torque. Consequently, uncomfortable sensations by the driver when changing speeds (when accelerating, and particularly during kick-down) with the continuously variable transmission 10 can be reduced.

According to the implementation, a hysteresis is created regarding the stepped operation amount which is converted, when an accelerator operation amount increases (when the accelerator pedal is being depressed), and when the accelerator operation amount decreases (when the accelerator pedal is being released). Accordingly, even if fluctuation occurs in the actual accelerator position nearby the switching point of step position (nearby where the number of steps changes), hunting of the step position can be prevented from occurring. Thus, hunting of the target gear ratio can be prevented.

According to the implementation, kick-down control is executed when the step position reaches a predetermined step position (kick-down determination position) or greater. That is to say, transition can be made to kick-down control regardless of the accelerator operation rate. Thus, kick-down control can be initiated regardless of individual differences among driver accelerator operations.

According to the implementation, in the case where, during executing of the kick-down control, the number of steps has increased by an amount equal to or greater than a first number of steps, kick-down control is started again. Accordingly, increasing the acceleration operation amount can initiate kick-down control multiple times. Thus, operations the same as with a conventional (stepped) automatic transmission, for example, can be performed.

According to the implementation, in the case where, during executing of the kick-down control, the number of steps has decreased by an amount equal to or greater than a second number of steps, the gear ratio is controlled to the high side. Accordingly, upshift gearshift is performed when the accelerator operation amount is reduced (the accelerator is let up on) during kick-down control. Thus, operations the same as with a conventional (stepped) automatic transmission, for example, can be performed.

According to the implementation, in the case where, during executing of the kick-down control, the number of steps has decreased by an amount equal to or greater than the third number of steps, the kick-down control is disengaged. Thus, kick-down control can be disengaged in a suitable and sure manner.

According to the implementation, upshift control is executed when the predetermined engine speed reaches the predetermined engine speed during executing of the kick-down control, and the gearshift speed is changed in accordance with the number of times of having executed upshift control. Thus, the increase in the engine speed at the time of starting kick-down control can be quickened, and the engine revolution increase curve can be made smoother each time upshift control is executed (the second time and thereafter).

While an implementation of the present invention has been described, the present invention is not restricted to the above implementation, and various modifications may be made. For example, while the present invention has been applied to a chain type continuously variable transmission (CVT) in the above implementation, the present invention may be applied to a belt type continuously variable transmission or a toroidal continuously variable transmission as well, instead of a chain type continuously variable transmission.

While the implementation has been described above with steps 0 through 8 in accordance to step positions (0 to 100%), the number of steps is not restricted to eight steps, and may be fewer than eight steps, or may be nine or more steps (e.g., 10 to 20 steps).

While the ECU 210 that controls the engine has been described in the above implementation as being separate hardware from the TCU 100 that controls the continuously variable transmission 10, an integrated hardware configuration may be used.

The invention claimed is:

1. A shift control device for a continuously variable transmission, the shift control device comprising:
   a detector that detects an accelerator operation amount;
   a converter that converts a continuous operation amount detected by the detector into a stepped operation amount;
   a controller that controls a gear ratio of the shift control device based on the stepped operation amount converted by the converter,
   wherein, in the case where the stepped operation amount reaches a predetermined amount or greater, the controller executes a kick-down control where the gear ratio is controlled to a low side, and
   wherein, during executing of the kick-down control, the controller executes an upshift control when a predetermined engine speed is reached, and changes a gearshift speed in accordance with a number of times of having executed the upshift control.

2. The shift control device for a continuously variable transmission according to claim 1, wherein the converter creates a hysteresis regarding the stepped operation amount which is converted, when an accelerator operation amount increases, and when the accelerator operation amount decreases.

3. The shift control device for a continuously variable transmission according to claim 2, wherein, in the case where, during executing of the kick-down control, the number of steps of the stepped operation amount has increased by an amount equal to or greater than a first number of steps as compared to the point when the kick-down control was started, the controller starts the kick-down control again.

4. The shift control device for a continuously variable transmission according to claim 3, wherein, in the case where, during executing of the kick-down control, the number of steps of the stepped operation amount has decreased by an amount equal to or greater than a second number of steps as compared to the point when the kick-down control was started, the controller controls the gear ratio to a high side.

5. The shift control device for a continuously variable transmission according to claim 4, wherein, in the case where, during executing of the kick-down control, the number of steps of the stepped operation amount has decreased by an amount equal to or greater than a third number of steps as compared to the point when the kick-down control was started, the controller disengages the kick-down control, and
   wherein, the third number of steps is a larger value than the second number of steps.

6. The shift control device for a continuously variable transmission according to claim 2, wherein, in the case where, during executing of the kick-down control, the number of steps of the stepped operation amount has decreased by an amount equal to or greater than a second number of steps as compared to the point when the kick-down control was started, the controller controls the gear ratio to a high side.

7. The shift control device for a continuously variable transmission according to claim 6, wherein, in the case where, during executing of the kick-down control, the number of steps of the stepped operation amount has decreased by an amount equal to or greater than a third number of steps as compared to the point when the kick-down control was started, the controller disengages the kick-down control, and wherein, the third number of steps is a larger value than the second number of steps.

8. The shift control device for a continuously variable transmission according to claim 1, wherein, in the case where, during executing of the kick-down control, the number of steps of the stepped operation amount has increased by an amount equal to or greater than a first number of steps as compared to the point when the kick-down control was started, the controller starts the kick-down control again.

9. The shift control device for a continuously variable transmission according to claim 8, wherein, in the case where, during executing of the kick-down control, the number of steps of the stepped operation amount has decreased by an amount equal to or greater than a second number of steps as compared to the point when the kick-down control was started, the controller controls the gear ratio to a high side.

10. The shift control device for a continuously variable transmission according to claim 9, wherein, in the case where, during executing of the kick-down control, the number of steps of the stepped operation amount has decreased by an amount equal to or greater than a third number of steps as compared to the point when the kick-down control was started, the controller disengages the kick-down control, and
wherein, the third number of steps is a larger value than the second number of steps.

11. The shift control device for a continuously variable transmission according to claim 1, wherein, in the case where, during executing of the kick-down control, the number of steps of the stepped operation amount has decreased by an amount equal to or greater than a second number of steps as compared to the point when the kick-down control was started, the controller controls the gear ratio to a high side.

12. The shift control device for a continuously variable transmission according to claim 11, wherein, in the case where, during executing of the kick-down control, the number of steps of the stepped operation amount has decreased by an amount equal to or greater than a third number of steps as compared to the point when the kick-down control was started, the controller disengages the kick-down control, and
wherein, the third number of steps is a larger value than the second number of steps.

13. A shift control device for a continuously variable transmission, the shift control device comprising:
a detector that detects an accelerator operation amount;
a converter that converts a continuous operation amount detected by the detector into a stepped operation amount; and
a controller that controls a gear ratio of the shift control device based on the stepped operation amount converted by the converter,
wherein, in the case where the stepped operation amount reaches a predetermined amount or greater, the controller executes a kick-down control where the gear ratio is controlled to a low side, and
wherein, in the case where, during executing of the kick-down control, a number of steps of the stepped operation amount has increased by an amount equal to or greater than a first number of steps as compared to the point when the kick-down control was started, the controller starts the kick-down control again.

14. The shift control device for a continuously variable transmission according to claim 13, wherein the converter creates a hysteresis regarding the stepped operation amount which is converted when an accelerator operation amount increases and when the accelerator operation amount decreases.

15. The shift control device for a continuously variable transmission according to claim 13, wherein, in the case where, during executing of the kick-down control, the number of steps of the stepped operation amount has decreased by an amount equal to or greater than a second number of steps as compared to the point when the kick-down control was started, the controller controls the gear ratio to a high side.

16. The shift control device for a continuously variable transmission according to claim 15, wherein, in the case where, during executing of the kick-down control, the number of steps of the stepped operation amount has decreased by an amount equal to or greater than a third number of steps as compared to the point when the kick-down control was started, the controller disengages the kick-down control, and
wherein, the third number of steps is a larger value than the second number of steps.

17. A shift control device for a continuously variable transmission, the shift control device comprising:
a detector that detects an accelerator operation amount;
a converter that converts a continuous operation amount detected by the detector into a stepped operation amount; and
a controller that controls a gear ratio of the shift control device based on the stepped operation amount converted by the converter,
wherein, in the case where the stepped operation amount reaches a predetermined amount or greater, the controller executes the kick-down control where the gear ratio is controlled to a low side, and
wherein, in the case where, during executing of the kick-down control, the number of steps of the stepped operation amount has decreased by an amount equal to or greater than a second number of steps as compared to the point when the kick-down control was started, the controller controls the gear ratio to a high side.

18. The shift control device for a continuously variable transmission according to claim 17, wherein the converter creates a hysteresis regarding the stepped operation amount which is converted, when an accelerator operation amount increases, and when the accelerator operation amount decreases.

19. The shift control device for a continuously variable transmission according to claim 17, wherein, in the case where, during executing of the kick-down control, the number of steps of the stepped operation amount has decreased by an amount equal to or greater than a third number of steps as compared to the point when the kick-down control was started, the controller disengages the kick-down control, and
wherein, the third number of steps is a larger value than the second number of steps.

* * * * *